(12) United States Patent
Hofmann

(10) Patent No.: US 8,535,009 B2
(45) Date of Patent: Sep. 17, 2013

(54) TAPERED ROLLER BEARING

(75) Inventor: Matthias Hofmann, Schweinfurt (DE)

(73) Assignee: Aktiebolaget SKF, Göteborg (SE)

( * ) Notice: Subject to any disclaimer, the term of this patent is extended or adjusted under 35 U.S.C. 154(b) by 683 days.

(21) Appl. No.: 12/731,709

(22) Filed: Mar. 25, 2010

(65) Prior Publication Data
US 2010/0247295 A1 Sep. 30, 2010

(51) Int. Cl.
*F04D 29/059* (2006.01)

(52) U.S. Cl.
USPC ............ 416/174; 415/2.1; 415/4.5; 415/142; 415/170.1; 415/229; 290/44; 290/55; 384/448; 384/567

(58) Field of Classification Search
USPC ........... 415/2.1, 4.5, 142, 170.1, 229; 416/9, 416/174; 290/43, 44, 54, 55; 384/448, 567
See application file for complete search history.

(56) References Cited

U.S. PATENT DOCUMENTS

| | | | |
|---|---|---|---|
| 3,948,578 A | 4/1976 | Martin | |
| 4,232,914 A * | 11/1980 | Bowen, III | 384/567 |
| 6,786,645 B2 | 9/2004 | Joki et al. | |
| 2005/0259901 A1 * | 11/2005 | Vignotto et al. | 384/448 |
| 2008/0159673 A1 | 7/2008 | Muranaka et al. | |

FOREIGN PATENT DOCUMENTS

| | | |
|---|---|---|
| DE | 1956147 U | 2/1967 |
| DE | 10102255 A1 | 8/2002 |
| DE | 10246825 A1 | 4/2004 |
| DE | 102004058905 A1 | 6/2006 |
| DE | 112005003355 T5 | 12/2007 |
| DE | JP2008082380 | 4/2008 |
| DE | 102007052383 A1 | 5/2008 |
| EP | 1408248 A2 | 12/2003 |
| WO | WO2007119953 A1 | 10/2007 |

* cited by examiner

*Primary Examiner* — Igor Kershteyn
(74) *Attorney, Agent, or Firm* — Bryan Peckjian; SKF USA Inc. Patent Department

(57) ABSTRACT

A two-row tapered roller bearing includes an outer ring (1) having an outer diameter of at least one meter, a first inner ring (2) and a second inner ring (3) that is disposed axially adjacent the first inner ring (2). A first set of conically-formed roller bodies (4) roll between the outer ring (1) and the first inner ring (2) and a second set of conically-formed roller bodies (5) are disposed axially adjacent the first roller bodies (4) and roll between the outer ring (1) and the second inner ring (3). A first sealing ring (11) is disposed axially adjacent the outer ring (1), is connected with the outer ring (1) and slips on a slip surface (16) of the first inner ring (2) in a contacting manner.

25 Claims, 4 Drawing Sheets

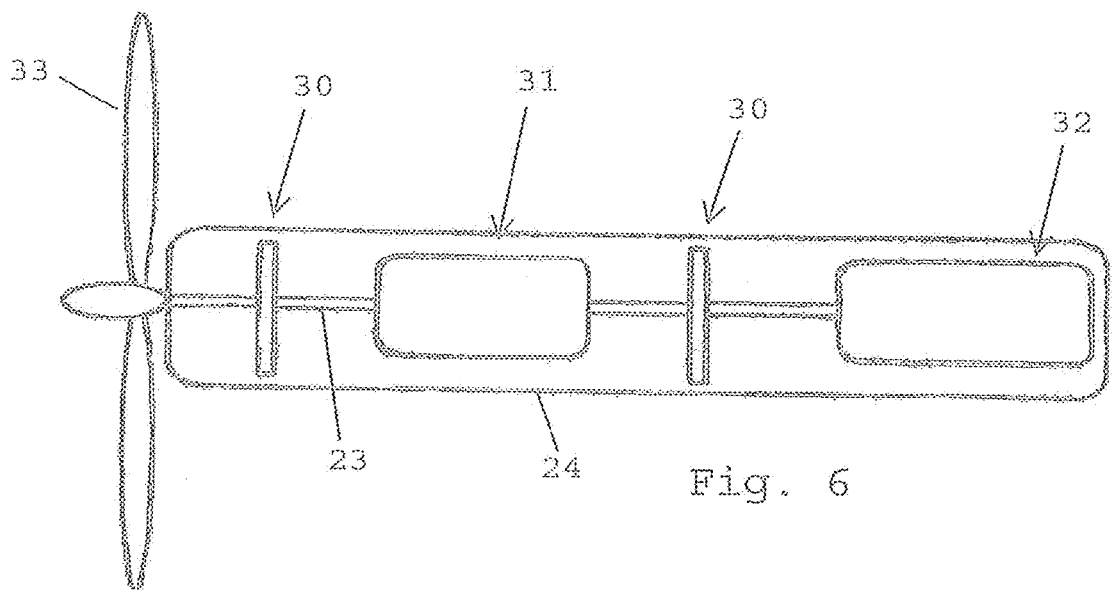

TAPERED ROLLER BEARING

CROSS-REFERENCE

This application claims priority to German patent application no. 10 2009 014 923.6, filed Mar. 25, 2009, which is incorporated by reference herein in its entirety.

TECHNICAL FIELD

The present invention generally relates to roller bearings having relatively large diameters, e.g., greater than one meter. Preferred roller bearings include two-row tapered roller bearings that may be utilized, e.g., to support a rotor shaft of a wind turbine.

KNOWN ART

Although bearings having an outer ring with a diameter of greater than one meter are generally known as large diameter bearings, other criteria and, e.g., other diameter-values could also be consulted for the definition of large diameter bearings. Generally speaking, bearings disclosed herein are considerably larger than bearings which have an outer diameter of a few centimeters and are utilized in typical everyday applications, such as e.g., in passenger cars.

When designing large diameter bearings, a pure upscaling of the bearing geometry starting from a known "small" bearing is normally not feasible, because different criteria require special consideration for large diameter bearings than for small diameter bearings, such as e.g., weight, the material(s) utilized to produce the bearing, the assembly cost, repair options, etc. For example, DE 10 2004 058 905 A1 discloses a large diameter bearing having an inner ring and an outer ring that are each composed of a plurality of segments in the circumferential direction. Due to the segmentation of the rings, it is possible to replace a damaged bearing without having to remove the shaft that is rotatably supported by the bearing.

SUMMARY

In one aspect of the present teachings, a high-quality and reliable large diameter bearing is disclosed that reduces material usage requirements.

In another aspect of the present teachings, a two-row tapered roller bearing may include an outer ring having an outer diameter of at least one meter, more preferably at least 1.5 meters. The bearing may further include a first inner ring disposed axially adjacent a second inner ring. Furthermore, the tapered roller bearing preferably includes a first set of first roller bodies, which are preferably conically-shaped and roll between the outer ring and the first inner ring, and second set of second roller bodies, which are also preferably conically-shaped, are disposed axially adjacent the first roller bodies and roll between the outer ring and the second inner ring. A first sealing ring is preferably connected with the outer ring on one axial side of the outer ring and is disposed so as to slip on or along a slip surface of the first inner ring in a contacting manner. More preferably, the entire first sealing ring is disposed axially adjacent to the outer ring.

According to this aspect of the present teachings, the outer ring can have a relatively narrow width in the axial direction, thereby reducing material requirements for the production of the tapered roller bearing while still ensuring a reliable sealing of the tapered roller bearing. A weight reduction also results from the material savings. In view of the larger diameter of the outer ring, a reduction of the axial width of the outer ring affects the achievable material savings substantially more with regard to the outer ring than the inner rings. Designs according to this aspect of the present teachings also have the advantage of reducing the risk of damaging the sealing ring(s) during the assembly of the tapered roller bearing.

The first inner ring and the second inner ring can be integrally formed as a common ring part. However, it is preferred that the two inner rings are formed as two separate parts, which provides, e.g., advantages during the assembly of the tapered roller bearing.

In another aspect of the present teachings, a second sealing ring can be provided axially adjacent the outer ring and can be connected, e.g., fixedly connected, with the outer ring. The second sealing ring is preferably disposed so as to slip on a slip surface of the second inner ring in a contacting manner. In such an embodiment, it is possible to completely seal the interior of the tapered roller bearing.

The first slip surface is preferably cylinder-shaped, which ensures well-defined slippage conditions for the sealing ring with axial tolerances. It is particularly advantageous when the first slip surface is formed at, on or near a shoulder of the first inner ring. The first inner ring and/or the second inner ring is preferably produced from a suitable, i.e. sufficiently hard, material and is manufactured with high precision. More preferably, the first slip surface and/or the second slip surface is ground in a twist-free or directionality-free manner, i.e. the first and/or second slip surface preferably has a non-directional surface finish, which ensures a high surface quality with very small shape- and mass deviations, as well as flawless rotation while minimizing wear over the service life of the roller bearing.

The first sealing ring can be attached to a first retaining ring. The first retaining ring can be attached to the outer ring. Such an embodiment provides a reliable seating of the first sealing ring at a relatively low cost. More preferably, the first retaining ring can be attached to the outer ring by screws that further serve to attach the outer ring in an installation environment. This particularly preferred embodiment has the advantage that no additional screws are necessary for the attachment of the first sealing ring.

In a further aspect of the present teachings, the first sealing ring and the first retaining ring may be integrally formed. In this case, it is possible to reduce the number of individual components that must be handled during assembly or repair. In addition or in the alternative, the first sealing ring and the first retaining ring can be comprised of the same material, which provides an especially efficient and cost-effective embodiment for realizing the first sealing ring. In addition, a sealing ring formed in such a manner can also include axially-oriented bores configured for the attachment of the sealing ring to the outer ring, e.g., via screws or bolts.

In a further aspect of the present teachings, the first sealing ring can include at least one sealing lip and/or the second sealing ring can include at least one sealing lip. The sealing lip(s) can be produced, e.g., by a machine-cutting operation, by injection molding or by vulcanization.

In a further aspect of the present teachings, the outer ring and/or the first inner ring and/or the second inner ring can be formed as a ring that is closed and/or continuous in the circumferential direction. In such an embodiment, a high mechanical stability and a good rolling behavior of the roller bodies on the tracks can be achieved.

In a further aspect of the present teachings, the first roller bodies can be disposed in a first cage and/or the second roller bodies can be disposed in a second cage. More preferably, the first cage and/or the second cage can be formed in a segmented or discontinuous manner in the circumferential direction, which reduces the danger of a mechanical overstressing of the cage and facilitates the expected thermal expansion.

In a further aspect of the present teachings, the first sealing ring and/or the second sealing ring can be manufactured, e.g., from polyurethane or polytetrafluoroethylene. These materials are particularly suitable when a high shape-stability is desired.

The tapered roller bearing can include grease as a lubricant. A reliable lubrication can be achieved thereby.

In a further aspect of the present teachings, the tapered roller bearing can be formed as a component of a wind turbine and/or may be utilized to rotatably support a rotor shaft utilized in a wind turbine.

The invention will be further explained in the following with the assistance of the exemplary embodiments illustrated in the drawings.

BRIEF DESCRIPTION OF THE DRAWINGS

FIG. 6 shows a representative wind turbine having a rotor shaft rotatably supported by tapered roller bearings according to the present teachings.[1]

[1]FIG. 6 and text in italics added to satisfy USPTO drawing requirements.

DETAILED DESCRIPTION OF THE PREFERRED EMBODIMENTS

Each of the additional features and teachings disclosed below may be utilized separately or in conjunction with other features and teachings to provide improved roller bearings and/or wind turbines, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
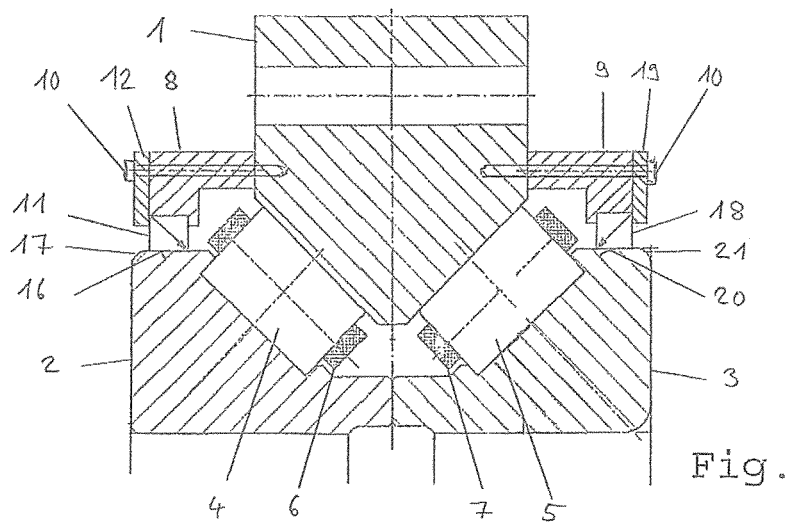
FIG. 1 shows an exemplary embodiment of a first representative tapered roller bearing in a cross-sectional illustration.

FIG. 1 shows a first exemplary embodiment of a tapered roller bearing according to the present teachings. The tapered roller bearing is formed with two rows of roller bodies and includes an outer ring 1 having two conical tracks. Furthermore, the tapered roller bearing includes two inner rings 2 and 3 disposed axially adjacent each other and each having a conical track. The outer ring 1 and the two inner rings 2, 3 are formed as continuous rings closed in the circumferential direction in the illustrated exemplary embodiment. However, it is also possible to utilize segmented rings, i.e. rings that include discontinuous segments that abut in the circumferential direction.

Conically-shaped roller bodies 4 roll on the conical track of the inner ring 2 and on the adjacent conical track of the outer ring 1. Conically-shaped roller bodies 5 roll on the conical track of the inner ring 3 and on the adjacent conical track of the outer ring 1. The roller bodies 4 are disposed in a cage 6 and the roller bodies 5 are disposed in a cage 7. The cages 6 and 7 are formed in a segmented manner in the illustrated exemplary embodiment, i.e. the cages 6, 7 are discontinuous, but abutting, in the circumferential direction. For example, the individual cage segments can be disposed one after another in the circumferential direction, as is disclosed in DE 102 46 825 A1, which is incorporated herein by reference. The cages 6, 7 or cage segments thereof can be made of plastic. However, it is noted that the cages 6, 7 can also be formed in a continuous manner in the circumferential direction.

A retaining ring 8 is attached to the outer ring 1 on one axial side using screws 10 and a retaining ring 9 is attached to the other axial side using screws 10. The retaining rings 8, 9 can be manufactured, e.g., from metal or plastic. High-quality roller bearing steel is not necessary for the sealing ring-retaining function.

A sealing ring 11 is attached to the retaining ring 8 using a clamping ring 12. The sealing ring 11 can be formed as a radial shaft seal. A sealing ring 11 formed in such a manner is depicted in FIG. 2 in a cross-sectional illustration.

Figure 2:
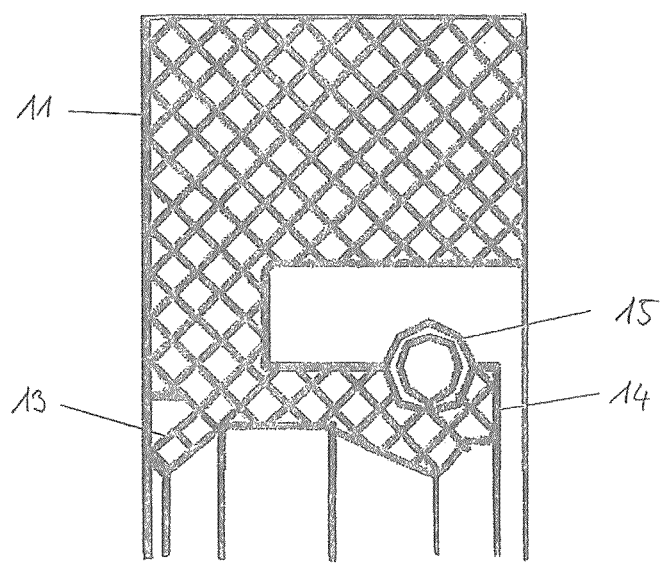
FIG. 2 shows the sealing ring of the tapered roller bearing illustrated in FIG. 1 in a cross-sectional illustration.

As can be derived in more detail from FIG. 2, the sealing ring 11 has a dust lip 13 and a sealing lip 14. The sealing lip 14 is urged radially inwards by a spring 15 (e.g., a garter spring) and lies in contact on the slip surface 16 that is formed on a shoulder 17 of the inner ring 2 (see also FIG. 1).

A sealing ring 18 is attached to the retaining ring 9 using a clamping ring 19. The sealing ring 18 is formed in an analogous manner to the sealing ring 11 and lies in contact on the slip surface 20 that is formed on the shoulder 21 of the inner ring 3.

The inner rings 2, 3 may comprise uniformly-hardened steel or only the areas of the tracks and the slip surfaces 16, 20 may be hardened steel. The slip surfaces 16, 20 are preferably manufactured with high precision and are, e.g., mechanically-ground in a twist-free or directionality-free manner. As utilized herein, the terms "twist-free" and/or "directionality-free" are intended to mean that the slip surfaces 16, 20 do not have any microscopically small structures that cause a fluid (e.g., lubricant) stream to be generated in the axial direction under the sealing lip 14 when the inner rings 2, 3 rotate.[2] The use of twist-free or directionality-free slip surfaces 16, 20 enable a reliable sealing to be achieved with low friction and such that the wear of the sealing lips 14 of the sealing rings 11, 18 is minimized.[2]

[2]Definition added to ensure proper interpretation of "directionality-free" (i.e. drallfrei).

The surface roughness of the slip surfaces 16, 20, as measured according to ISO 4288-1985, preferably falls within the following ranges:

$R_a$ 0.2 to 0.8 μm
$R_z$ 1 to 4 μm
$R_{max}$ 6.3 μm

The lower values for $R_a$ and $R_z$ are minimum values in order to ensure that a sufficient amount of lubricant (e.g., grease) is held on the slip surfaces 16, 20 to prevent damage to the sealing lip 14 during operation. In addition, the temperature rise caused by inadequate lubrication, particularly at high rotational speeds, would lead to hardening and cracking of the sealing lip 14 and thus to premature seal failure. On the other hand, if the surfaces are too rough, there will be excessive seal lip wear and seal life will be shortened. If the value $R_{max}$ is exceeded, leakage may occur.

As mentioned above, it is also preferable that the machining operation does not leave any directionality behind on the slip surfaces 16, 20, as this could lead to leakage by pumping action, depending on the direction of rotation. A suitable surface can be achieved, e.g., by plunge grinding; whole number ratios of the grinding wheel speed to the workpiece speed are preferably avoided. The grinding wheel may be dressed using a cluster head dressing tool and the smallest possible lateral feed, or a profile dressing roll without lateral feed.

The slip surfaces 16, 20 should also be free of any damage such as bruises, scratches, cracks, rust or raised sections. It is therefore important that it not only be carefully machined but also that it be properly protected until final mounting takes place. Such protection can, for instance, be provided by threading a cardboard tube over the slip surfaces 16, 20, or preferably over the whole shaft.[3]

[3]Text in italics is not in original German text and has been taken from: http://www.skf.com/portal/skf/home/products?maincatalogue=1&lang=en&newlink=4 1 21v Grease is not illustrated in the Figures, but may preferably be provided as a lubricant in the inner space of the tapered roller bearing, which inner space is sealed by the sealing rings 11, 18.

In a preferred application of the tapered roller bearing illustrated in FIG. 1, the outer ring 1 remains stationary during operation and the two inner rings 2, 3 rotate relative to the outer ring 1. Accordingly, the sealing rings 11, 18 remain stationary and the respective sealing lips 14 abut on the rotating slip surfaces 16, 20 of the inner rings 2, 3. In particularly preferred embodiments, the tapered roller bearing can be utilized in a wind turbine as a rotor bearing, which embodiment will be discussed below. As was noted above, a reliable sealing over a long service life is achievable with the sealing rings 11, 18 in view of the high-precision construction of the slip surfaces 16, 20. Furthermore, if the sealing rings 11, 18 become damaged during operation, they can be individually replaced.

Figure 3:
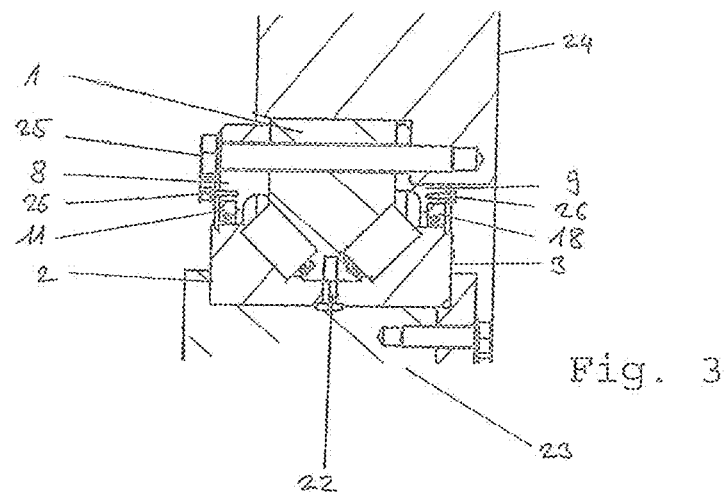
FIG. 3 shows a further exemplary embodiment of a second representative tapered roller bearing in a cross-sectional illustration.

FIG. 3 shows a second exemplary embodiment of a representative tapered roller bearing in a cross-sectional illustration. This exemplary embodiment differs from FIG. 1 with respect to the attachment of the sealing rings 11, 18. In addition, a grease channel 22 is illustrated in FIG. 3, which extends in the radial direction along the axial border of the two inner rings 2, 3. Further, in FIG. 3, the installation environment of the tapered roller bearing is also indicated, as will be discussed further in the next paragraph. The two exemplary embodiments coincide in other respects.

The installation environment illustrated in FIG. 3 is a section of a wind turbine that surrounds the tapered roller bearing. More specifically, a rotor shaft 23 and a bearing housing 24 are illustrated. The two inner rings 2, 3 sit on the rotor shaft 23 and rotate with it. The outer ring 1 is disposed in a bore of the bearing housing 24 and is fixedly attached to the bearing housing 24 using axially-extending screws 25. In addition, the retaining rings 8, 9 are also laterally attached to the outer ring 1 by the screws 25, so that no additional screws are necessary for the attachment of the retaining rings 8, 9. The two retaining rings 8, 9 may be formed in a differing manner in accordance with the particular installation environment. The attachment of the sealing rings 11, 18 to the retaining rings 8, 9 by the clamping rings 12, 19 may be analogous to FIG. 1. The clamping rings 12, 19 may be fixedly attached to the retaining rings 8, 9 by the screws 26.

The sealing rings 11, 18 are preferably formed in an analogous manner to FIG. 2 and slip on or slidingly contact the slip surfaces 16, 20 of the inner rings 2, 3 similar to the exemplary embodiment of FIG. 1. Since the outer ring 1 is attached to the bearing housing 24 by screws 25, the outer ring 1 and the bearing housing 24 do not rotate during operation and thus remain stationary. Consequently, the sealing rings 11, 18 attached to the outer ring 1 also remain stationary and the sealing lips 14 slip or slidingly contact on the slip surfaces 16, 20 of the inner rings 2, 3 that rotate relative to the sealing rings 11, 18.

Figure 4:
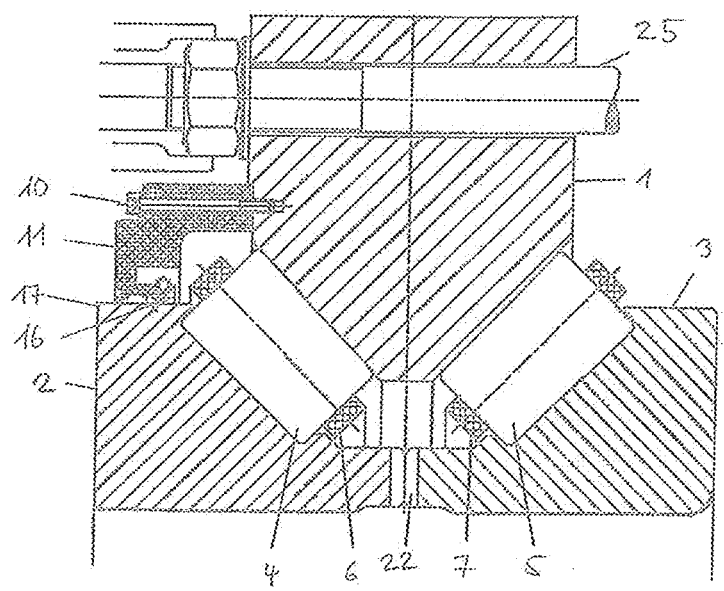
FIG. 4 shows a further exemplary embodiment of a third representative tapered roller bearing in a cross-sectional illustration.

FIG. 4 shows a third exemplary embodiment of a representative tapered roller bearing in a cross-sectional illustration. In this embodiment, only one sealing ring 11 is shown. However, the embodiment of FIG. 4 may be modified to include both sealing rings 11, 18, wherein the not-illustrated sealing ring 18 may be formed in a manner analogous to the illustrated sealing ring 11.

The tapered roller bearing illustrated in FIG. 4 differs from FIGS. 1 and 3 in particular with respect to the construction of the sealing ring 11. Unlike FIGS. 1 and 3, the sealing ring 11 in FIG. 4 is not clamped in the retaining ring 8, but rather is directly fastened together with the outer ring 1 by screws 10. This means that, in the exemplary embodiment of FIG. 4, the retaining ring 8 and the clamping ring 12 are omitted and a different embodiment of the sealing ring 11 is utilized than the embodiment illustrated in FIG. 2.

Figure 5:
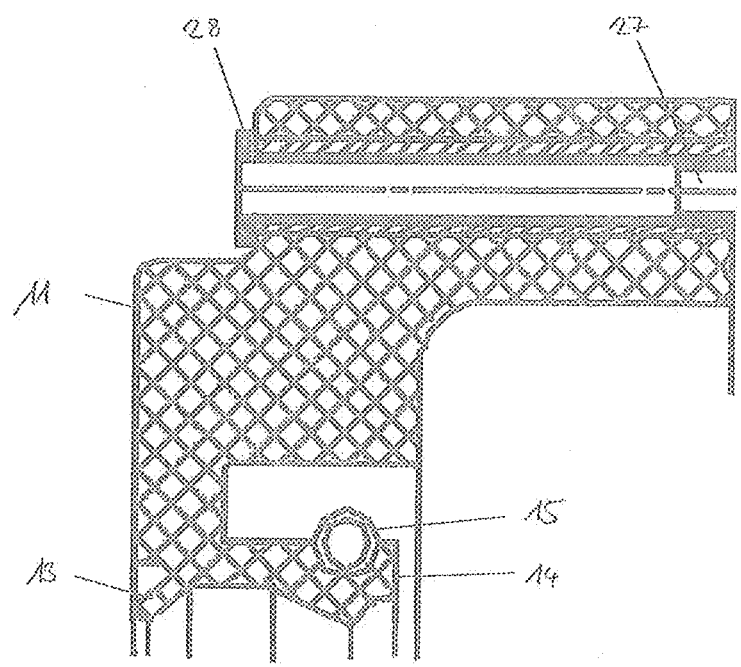
FIG. 5 shows the sealing ring of the tapered roller bearing illustrated in FIG. 4 in a cross-sectional illustration.

The construction of the sealing ring 11 utilized in FIG. 4 will be explained in more detail with the assistance of FIG. 5, which shows the sealing ring 11 in a cross-sectional illustration. Analogous to FIG. 2, the sealing ring 11 is equipped with the dust lip 13, the sealing lip 14 and the spring 15. In addition, the sealing ring 11 includes bores 27 extending in the axial direction. Sleeves 28 for receiving the screws 10 are inserted into the bores 27. In order to ensure a reliable function of the sealing ring 11 in a long-lasting manner, it is also necessary that it possesses a sufficient shape-stability. This shape-stability can be achieved by selecting an appropriate material for the sealing ring 11. Polyurethane (PUR) and polytetrafluoroethylene (PTFE), in particular, are suitable as materials. When using these materials, the sealing ring 11 can be produced completely, i.e. inclusive of the dust lip 13 and the sealing lip 14, from a single material. The production can take place, e.g., by lathing or another machine-cutting process. Likewise, it is also possible, however, to produce the sealing ring 11, in particular the dust lip 13 and the sealing lip 14, using injection molding or vulcanization.

As to the remaining structures, the exemplary embodiment of FIG. 4 corresponds to the exemplary embodiments of FIGS. 1 and 3, wherein the grease channel 22 previously illustrated in FIG. 3 is again present.

FIG. 6 shows a representative wind turbine that may utilize one or more tapered roller bearings 30 according to the present teachings to rotatably support a rotor shaft 23. The wind turbine may optionally also include a gearbox 31 and a generator 32, which are driven by rotor blades 33. A bearing housing 24 may support the outer ring 1 of the tapered roller bearing 30.[4]

[4]FIG. 6 and text added to satisfy USPTO drawing requirements.

REFERENCE NUMBER LIST:

1 Outer ring
2 Inner ring
3 Inner ring
4 Roller bearing
5 Roller bearing
6 Cage
7 Cage
8 Retainer ring
9 Retainer ring
10 Screw
11 Sealing ring
12 Clamping ring
13 Dust lip
14 Sealing lip
15 Spring
16 Slip surface
17 Shoulder
18 Sealing ring
19 Clamping ring
20 Slip surface
21 Shoulder
22 Grease channel
23 Rotor shaft
24 Bearing housing
25 Screw
26 Screw
27 Bore
28 Sleeve
30 Tapered roller bearing
31 Gearbox
32 Generator
33 Rotor blades

The invention claimed is:

1. A two-row tapered roller bearing comprising:
an outer ring having an outer diameter of at least one meter,
a first inner ring,
a second inner ring disposed axially adjacent the first inner ring,
a first set of conically-shaped roller bodies disposed so as roll between the outer ring and the first inner ring,
a second set of conically-shaped roller bodies disposed axially adjacent the first roller bodies and so as to roll between the outer ring and the second inner ring, and
a first sealing ring disposed axially adjacent the outer ring, the first sealing ring being connected with the outer ring and configured to slip on a slip surface of the first inner ring in a contacting manner when the first inner ring rotates, wherein
the first sealing ring is fixed to a first retaining ring via a first clamping ring, and wherein
the first retaining ring is attached to the outer ring via a screw connection.

2. A tapered roller bearing according to claim 1, further comprising:
a second sealing ring disposed axially adjacent the outer ring, the second sealing ring being connected with the outer ring and configured to slip on a slip surface of the second inner ring in a contacting manner when the second inner ring rotates.

3. A tapered roller bearing according to according to claim 1, wherein the first slip surface is cylinder-shaped.

4. A tapered roller bearing according to according to claim 3, wherein the first slip surface is formed at a shoulder of the first inner ring.

5. A tapered roller bearing according to according to claim 1, wherein the first slip surface has a non-directional surface finish.

6. A tapered roller bearing according to according to claim 1, further comprising a first retaining ring attached to the first sealing ring.

7. A tapered roller bearing according to claim 6, wherein the first retaining ring is attached to the outer ring.

8. A tapered bearing according to claim 7, wherein the first retaining ring is attached to the outer ring by screws that also serve to attach the outer ring to another structure.

9. A tapered bearing according to claim 6, wherein the first sealing ring and the first retaining ring are formed integrally.

10. A tapered bearing according to claim 6, wherein the first sealing ring and the first retaining ring are comprised of the same material.

11. A tapered roller bearing according to claim 1, wherein the first sealing ring has at least one sealing lip.

12. A tapered roller bearing according to claim 1, wherein at least one of the outer ring, the first inner ring and the second inner ring is formed as a ring that is closed and continuous in the circumferential direction.

13. A tapered roller bearing according to claim 1, further comprising a first cage retaining the first roller bodies, wherein the first cage is formed in a segmented manner.

14. A tapered roller bearing according to claim 1, wherein the first sealing ring is manufactured from one of polyurethane and polytetrafluoroethylene.

15. A tapered roller bearing according to claim 1, further comprising grease disposed in an interior sealed portion of the taper roller bearing and serving as a lubricant.

16. A tapered roller bearing according to claim 1, wherein the outer ring comprises a first conical track contacting the first set of roller bodies and a second conical track contacting the second set of roller bodies and wherein the first and second set of roller bodies are disposed substantially in a V-shape as viewed in an axial cross-section with axially-adjacent ends of the first and second roller bodies being disposed radially inward of the axially-remote ends of the first and second roller bodies.

17. A tapered roller bearing according to according to claim 16, wherein the first slip surface is cylinder-shaped and has a non-directional surface finish, the first slip surface is formed at a shoulder of the first inner ring, the first sealing rings has a sealing lip in sliding contact with the first slip surface, and at least the sealing lip of the first sealing ring comprises one of polyurethane and polytetrafluoroethylene, and wherein the tapered roller bearing further comprises:
a first retaining ring attached to the first sealing ring and to the outer ring,
a first cage retaining the first roller bodies, wherein the first cage is formed in a segmented manner and
grease disposed at least in an interior space near the axially-adjacent ends of the roller bodies.

18. A wind turbine comprising:
a rotor shaft and a tapered roller bearing according to claim 1 rotatably supporting the rotor shaft.

19. A wind turbine according to claim 18 further comprising a bearing housing, wherein the bearing housing is directly connected to the outer ring of the tapered roller bearing by screws.

20. A tapered roller bearing according to claim 1, wherein the first clamping ring is fixed to the first retaining ring via a screw connection.

21. A tapered roller bearing according to claim 1, the first clamping ring and the first retaining ring are attached to the outer ring by a common screw connection.

22. A tapered roller bearing according to claim 1, the first retaining ring is attached to the outer ring by screws that also attach the outer ring to another structure.

23. A tapered roller bearing according to claim 1, the first sealing ring is clamped between the first clamping ring and the first retaining ring.

24. A tapered roller bearing comprising:
- an outer ring having an outer diameter of at least one meter, wherein a radially-inner surface of the outer ring comprises a first conical track and a second conical track axially adjacent to the first conical track,
- a first inner ring having a conical track,
- a second inner ring having a conical track,
- a first set of conically-shaped roller bodies disposed so as roll between the first conical track of the outer ring and the conical track of the first inner ring,
- a second set of conically-shaped roller bodies disposed so as to roll between the second conical track of the outer ring and the conical track of second inner ring, and
- a first sealing ring disposed axially adjacent the outer ring, the first sealing ring being connected with the outer ring and being in a sliding, sealed contact with a slip surface of the first inner ring, wherein the first and second set of roller bodies are disposed substantially in a V-shape as viewed in an axial cross-section with axially-adjacent ends of the first and second roller bodies being disposed radially inward of the axially-remote ends of the first and second roller bodies, wherein the first sealing ring is fixed to a first retaining ring via a first clamping ring, and wherein the first retaining ring is attached to the outer ring via a screw connection.

25. A two-row tapered roller bearing comprising:
- an outer ring having an outer diameter of at least one meter,
- a first inner ring,
- a second inner ring disposed axially adjacent the first inner ring,
- a first set of conically-shaped roller bodies disposed so as roll between the outer ring and the first inner ring,
- a second set of conically-shaped roller bodies disposed axially adjacent the first roller bodies and so as to roll between the outer ring and the second inner ring, and
- a first sealing ring disposed axially adjacent the outer ring, the first sealing ring being connected with the outer ring and configured to slip on a slip surface of the first inner ring in a contacting manner when the first inner ring rotates, wherein the first sealing ring is fixed to the outer ring via screws extending axially threw bores in the first sealing ring.

* * * * *